US012803821B2

(12) United States Patent
Osborn et al.

(10) Patent No.: US 12,803,821 B2
(45) Date of Patent: *Nov. 17, 2026

(54) SYSTEMS AND METHODS FOR TRANSACTION CARD-BASED AUTHENTICATION

(71) Applicant: Capital One Services, LLC, McLean, VA (US)

(72) Inventors: Kevin Osborn, Newton Highlands, MA (US); Samuel Patrick Edwards, Richmond, VA (US); Vincent Vy Ngo, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/942,081

(22) Filed: Nov. 8, 2024

(65) Prior Publication Data

US 2025/0141700 A1 May 1, 2025

Related U.S. Application Data

(63) Continuation of application No. 17/214,073, filed on Mar. 26, 2021, now Pat. No. 12,143,515.

(51) Int. Cl.
*H04L 29/06* (2006.01)
*H04L 9/08* (2006.01)
(Continued)

(52) U.S. Cl.
CPC .......... *H04L 9/3271* (2013.01); *H04L 9/0894* (2013.01); *H04L 9/3247* (2013.01);
(Continued)

(58) Field of Classification Search
CPC ... H04L 9/3271; H04L 9/0894; H04L 9/3247; H04L 9/3263; H04L 63/0884;
(Continued)

(56) References Cited

U.S. PATENT DOCUMENTS

| | | | |
|---|---|---|---|
| 5,590,038 | A | 12/1996 | Pitroda |
| 5,666,415 | A | 9/1997 | Kaufman |

(Continued)

FOREIGN PATENT DOCUMENTS

| | | | |
|---|---|---|---|
| CN | 101192295 | A | 6/2008 |
| GB | 2516861 | A | 2/2015 |

(Continued)

OTHER PUBLICATIONS

EMVco, LLC, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

(Continued)

*Primary Examiner* — Harunur Rashid
(74) *Attorney, Agent, or Firm* — KDW Firm PLLC; Andrew D. Kasnevich

(57) ABSTRACT

Systems and methods for transaction card-based authentication are provided. In an exemplary method, a user communication device establishes a near field communication (NFC) session with a transaction card and transmits to the transaction card an NFC data exchange format (NDEF) WRITE TAG command including session-specific challenge information. The user communication device transmits to the transaction card an NDEF READ TAG command and receives from the transaction card card-specific challenge response information. The challenge response information is then used to authenticate the transaction card.

20 Claims, 4 Drawing Sheets

(51) Int. Cl.
*H04L 9/32* (2006.01)
*H04L 9/40* (2022.01)

(52) U.S. Cl.
CPC ........ *H04L 9/3263* (2013.01); *H04L 63/0884* (2013.01); *H04L 2209/805* (2013.01)

(58) Field of Classification Search
CPC .......... H04L 2209/805; G06Q 20/3821; G06Q 20/352; G06Q 20/40975; G06F 21/77; H04W 12/06; H04W 12/47
See application file for complete search history.

(56) References Cited

U.S. PATENT DOCUMENTS

| | | | | |
|---|---|---|---|---|
| 6,199,114 | B1 | 3/2001 | White | |
| 6,324,271 | B1 | 11/2001 | Sawyer | |
| 6,367,011 | B1 | 4/2002 | Lee | |
| 6,572,015 | B1 | 6/2003 | Norton | |
| 7,252,242 | B2 | 8/2007 | Ho | |
| 7,270,276 | B2 | 9/2007 | Vayssiere | |
| 7,287,692 | B1 | 10/2007 | Patel | |
| 7,374,099 | B2 | 5/2008 | de Jong | |
| 7,527,208 | B2 | 5/2009 | Hammad | |
| 7,568,631 | B2 | 8/2009 | Gibbs | |
| 7,584,153 | B2 | 9/2009 | Brown | |
| 7,628,322 | B2 | 12/2009 | Holtmanns | |
| 7,793,851 | B2 | 9/2010 | Mullen | |
| 7,801,799 | B1 | 9/2010 | Brake, Jr. | |
| 7,908,216 | B1 | 3/2011 | Davis | |
| 7,922,082 | B2 | 4/2011 | Muscato | |
| 8,010,405 | B1 | 8/2011 | Bortolin | |
| 8,074,877 | B2 | 12/2011 | Mullen | |
| 8,082,450 | B2 | 12/2011 | Frey | |
| 8,108,687 | B2 | 1/2012 | Ellis | |
| 8,186,602 | B2 | 5/2012 | Itay | |
| 8,196,131 | B1 | 6/2012 | von Behren | |
| 8,249,654 | B1 | 8/2012 | Zhu | |
| 8,276,814 | B1 | 10/2012 | Davis | |
| 8,332,272 | B2 | 12/2012 | Fisher | |
| 8,346,670 | B2 | 1/2013 | Hasson | |
| 8,511,547 | B2 | 8/2013 | Rans | |
| 8,519,822 | B2 | 8/2013 | Riegebauer | |
| 8,750,514 | B2 | 6/2014 | Gallo | |
| 8,870,081 | B2 | 10/2014 | Olson | |
| 9,038,893 | B2 | 5/2015 | Kirkham | |
| 9,129,199 | B2 | 9/2015 | Spodak | |
| 9,183,490 | B2 | 11/2015 | Moreton | |
| 9,275,325 | B2 | 3/2016 | Newcombe | |
| 9,286,606 | B2 | 3/2016 | Diamond | |
| 9,306,753 | B1 | 4/2016 | Vandervort | |
| 9,501,776 | B2 | 11/2016 | Martin | |
| 9,710,744 | B2 | 7/2017 | Wurmfeld | |
| 9,949,065 | B1 | 4/2018 | Zarakas | |
| 9,965,632 | B2 | 5/2018 | Zarakas | |
| 9,965,911 | B2 | 5/2018 | Wishne | |
| 9,977,890 | B2 | 5/2018 | Alberti | |
| 9,978,056 | B2 | 5/2018 | Seo | |
| 9,978,058 | B2 | 5/2018 | Wurmfeld | |
| 9,990,795 | B2 | 6/2018 | Wurmfeld | |
| 10,007,873 | B2 | 6/2018 | Heo | |
| 10,013,693 | B2 | 7/2018 | Wyatt | |
| 10,121,130 | B2 | 11/2018 | Pinski | |
| 10,210,505 | B2 | 2/2019 | Zarakas | |
| 10,242,368 | B1 | 3/2019 | Poole | |
| 10,296,910 | B1 | 5/2019 | Templeton | |
| 10,332,102 | B2 | 6/2019 | Zarakas | |
| 10,360,557 | B2 | 7/2019 | Locke | |
| 10,380,471 | B2 | 8/2019 | Locke | |
| 10,395,244 | B1 | 8/2019 | Mossler | |
| 10,453,054 | B2 | 10/2019 | Zarakas | |
| 10,474,941 | B2 | 11/2019 | Wurmfeld | |
| 10,475,027 | B2 | 11/2019 | Guise | |
| 10,482,453 | B2 | 11/2019 | Zarakas | |
| 10,482,457 | B2 | 11/2019 | Poole | |
| 10,489,774 | B2 | 11/2019 | Zarakas | |
| 10,489,781 | B1 | 11/2019 | Osborn | |
| 10,510,070 | B2 | 12/2019 | Wurmfeld | |
| 10,515,361 | B2 | 12/2019 | Zarakas | |
| 10,535,068 | B2 | 1/2020 | Locke | |
| 10,546,444 | B2 | 1/2020 | Osborn | |
| 10,581,611 | B1 | 3/2020 | Osborn | |
| 10,664,830 | B1 | 5/2020 | Rule | |
| 10,685,349 | B2 | 6/2020 | Brickell | |
| 10,749,885 | B1 * | 8/2020 | Hoorvitch | H04L 63/08 |
| 10,797,882 | B2 | 10/2020 | Rule | |
| 10,880,741 | B2 | 12/2020 | Zarakas | |
| 10,909,525 | B1 * | 2/2021 | Dhodapkar | G06Q 20/3278 |
| 10,970,691 | B2 | 4/2021 | Koeppel | |
| 10,984,416 | B2 | 4/2021 | Ilincic | |
| 11,037,136 | B2 | 6/2021 | Rule | |
| 11,062,098 | B1 | 7/2021 | Bergeron | |
| 11,120,453 | B2 | 9/2021 | Rule | |
| 11,138,593 | B1 | 10/2021 | Ho | |
| 11,138,605 | B2 | 10/2021 | Aabye | |
| 11,176,540 | B2 | 11/2021 | Gupta | |
| 11,188,908 | B2 | 11/2021 | Locke | |
| 11,216,806 | B2 | 1/2022 | Mossler | |
| 11,297,958 | B2 | 4/2022 | Vukich | |
| 11,334,872 | B2 | 5/2022 | Phillips | |
| 11,361,173 | B2 | 6/2022 | Edwards | |
| 11,361,174 | B1 * | 6/2022 | Robshaw | H04L 9/3242 |
| 11,392,933 | B2 | 7/2022 | Mossler | |
| 11,392,935 | B2 | 7/2022 | Suresh | |
| 11,416,844 | B1 | 8/2022 | Osterkamp | |
| 11,423,392 | B1 | 8/2022 | Ho | |
| 11,443,292 | B2 | 9/2022 | Sherif | |
| 11,444,770 | B2 | 9/2022 | Wieker | |
| 11,461,764 | B2 | 10/2022 | Rule | |
| 11,481,764 | B2 | 10/2022 | Shakkarwar | |
| 11,521,213 | B2 | 12/2022 | Rule | |
| 11,551,200 | B1 | 1/2023 | Cook | |
| 11,556,918 | B2 | 1/2023 | Mestre | |
| 11,615,395 | B2 | 3/2023 | McHUGH | |
| 11,777,933 | B2 | 10/2023 | Moreton | |
| 2003/0220876 | A1 | 11/2003 | Burger | |
| 2005/0156026 | A1 | 7/2005 | Ghosh | |
| 2005/0225427 | A1 * | 10/2005 | Bell | G07C 9/28 340/5.2 |
| 2005/0228997 | A1 | 10/2005 | Bicker | |
| 2005/0269402 | A1 | 12/2005 | Spitzer | |
| 2007/0276765 | A1 | 11/2007 | Hazel | |
| 2008/0082452 | A1 | 4/2008 | Wankmueller | |
| 2008/0099552 | A1 | 5/2008 | Grillion | |
| 2009/0143104 | A1 | 6/2009 | Loh | |
| 2009/0235339 | A1 | 9/2009 | Mennes | |
| 2009/0282264 | A1 | 11/2009 | Amiel | |
| 2011/0113245 | A1 | 5/2011 | Varadarajan | |
| 2011/0134044 | A1 * | 6/2011 | Carapelli | G06F 21/86 345/520 |
| 2011/0155801 | A1 | 6/2011 | Rowberry | |
| 2012/0143703 | A1 | 6/2012 | Wall | |
| 2012/0271380 | A1 * | 10/2012 | Roberts | H04L 63/068 607/60 |
| 2013/0030997 | A1 | 1/2013 | Spodak | |
| 2013/0146657 | A1 | 6/2013 | Graef | |
| 2013/0211937 | A1 | 8/2013 | Elbirt | |
| 2013/0268687 | A1 * | 10/2013 | Schrecker | H04W 12/06 709/229 |
| 2013/0311363 | A1 | 11/2013 | Ramaci | |
| 2014/0074637 | A1 | 3/2014 | Hammad | |
| 2014/0074655 | A1 | 3/2014 | Lim | |
| 2014/0081785 | A1 | 3/2014 | Valadas Preto | |
| 2014/0365377 | A1 | 12/2014 | Salama | |
| 2015/0032635 | A1 | 1/2015 | Guise | |
| 2015/0073983 | A1 | 3/2015 | Bartenstein | |
| 2015/0113271 | A1 | 4/2015 | Jooste | |
| 2015/0134513 | A1 | 5/2015 | Olson | |
| 2015/0199673 | A1 | 7/2015 | Savolainen | |
| 2015/0199863 | A1 | 7/2015 | Scoggins | |
| 2015/0254637 | A1 | 9/2015 | Yang | |
| 2015/0317295 | A1 | 11/2015 | Sherry | |
| 2016/0078430 | A1 | 3/2016 | Douglas | |

(56) References Cited

U.S. PATENT DOCUMENTS

| | | | | |
|---|---|---|---|---|
| 2016/0105290 | A1* | 4/2016 | Khalil | H04L 63/0815 713/168 |
| 2016/0189143 | A1 | 6/2016 | Koeppel | |
| 2016/0253651 | A1 | 9/2016 | Park | |
| 2016/0277383 | A1 | 9/2016 | Guyomarc'h | |
| 2016/0307189 | A1 | 10/2016 | Zarakas | |
| 2016/0314472 | A1 | 10/2016 | Ashfield | |
| 2016/0379217 | A1 | 12/2016 | Hammad | |
| 2017/0017957 | A1 | 1/2017 | Radu | |
| 2017/0039566 | A1 | 2/2017 | Schipperheijn | |
| 2017/0068950 | A1 | 3/2017 | Kwon | |
| 2017/0330173 | A1 | 11/2017 | Woo | |
| 2018/0039987 | A1 | 2/2018 | Molino | |
| 2018/0227321 | A1 | 8/2018 | Freund et al. | |
| 2018/0262336 | A1* | 9/2018 | Fujiwara | H04L 9/321 |
| 2018/0268132 | A1 | 9/2018 | Buer | |
| 2018/0300716 | A1 | 10/2018 | Carlson | |
| 2019/0172055 | A1 | 6/2019 | Hale | |
| 2019/0303945 | A1 | 10/2019 | Mitra | |
| 2019/0385429 | A1* | 12/2019 | Pochtar | G08B 13/26 |
| 2021/0004806 | A1 | 1/2021 | Noe | |
| 2021/0272098 | A1 | 9/2021 | Delsuc | |
| 2021/0304189 | A1 | 9/2021 | Gupta | |
| 2021/0383360 | A1 | 12/2021 | Sinha | |
| 2021/0406869 | A1 | 12/2021 | Pathrabe | |
| 2022/0114581 | A1 | 4/2022 | Upadhye | |
| 2022/0284416 | A1 | 9/2022 | Rule | |
| 2022/0309509 | A1 | 9/2022 | Akgun | |
| 2022/0335412 | A1 | 10/2022 | Rule | |
| 2022/0366410 | A1 | 11/2022 | Rule | |
| 2022/0398566 | A1 | 12/2022 | Rule | |
| 2022/0414648 | A1 | 12/2022 | Rule | |
| 2023/0054157 | A1 | 2/2023 | Mao | |
| 2023/0065163 | A1 | 3/2023 | Vargas | |
| 2023/0083785 | A1 | 3/2023 | Maiman | |
| 2023/0169505 | A1 | 6/2023 | Rule | |
| 2023/0354020 | A1 | 11/2023 | Rule | |
| 2023/0359839 | A1 | 11/2023 | Lovgren | |

FOREIGN PATENT DOCUMENTS

| | | | |
|---|---|---|---|
| GB | 2551907 | A | 1/2018 |
| JP | 2011258070 | A | 12/2011 |
| JP | 2013017140 | A | 1/2013 |
| JP | 2020096321 | A | 6/2020 |
| JP | 2020530726 | A | 10/2020 |
| KR | 20150140132 | A | 12/2015 |
| WO | 9910824 | A1 | 3/1999 |
| WO | 0049586 | A1 | 8/2000 |
| WO | 2013155562 | A1 | 10/2013 |
| WO | 2015183818 | A1 | 12/2015 |
| WO | 2017047855 | A1 | 3/2017 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

EMVCo, LLC, "EMV Card Personalization Specification," Version 1.0 (2003), 81 pages.

EMVCo, LLC, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive. org/, 75 pages.

EMVCo, Llc, "EMV Card Personalisation Specification", Aug. 1, 2021, pp. 1-114, Retrieved from Internet URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMACpdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

SYSTEMS AND METHODS FOR TRANSACTION CARD-BASED AUTHENTICATION

CROSS-REFERENCE TO RELATED APPLICATION

This application is a continuation of U.S. patent application Ser. No. 17/214,073, filed Mar. 26, 2021, now U.S. Pat. No. 12,143,515, the contents of which are incorporated herein by reference in their entirety.

FIELD OF THE INVENTION

The present disclosure relates generally to transaction security and, more specifically, to exemplary systems, methods, and computer-accessible mediums for using a transaction card to carry out a challenge response security protocol.

BACKGROUND OF THE INVENTION

The development of electronic commerce has led to the convenience of consumers and businesses alike. Transactions may be conducted between and among parties from virtually any location and at any time. Use of cards such as credit and debit cards has enhanced the ability to conduct transactions over networks, as consumers may engage in purchase transactions, or conduct other business, merely by providing credentials including a name, a card number, and other data such as, for example, a card expiration date, a card security code, or a billing zip code.

But the increasing use of cards has also resulted in increased risk of fraud or theft. Despite efforts to make card-based transactions more secure, smart cards and other devices may often be vulnerable to replay attacks in which card and/or transaction information is intercepted and subsequently used in a fraudulent manner to carry out additional transactions.

SUMMARY OF THE INVENTION

An illustrative aspect of the invention provides a method of communicating with a transaction card having a card data processor, a near card field communication (NFC) interface, and a card memory having a unique card identifier stored therein, The method comprises establishing, by a user communication device, a first NFC session with the transaction card and transmitting, by the user communication device to the transaction card, an NFC data exchange format (NDEF) WRITE TAG command including session-specific challenge information. The method further comprises transmitting, by the user communication device to the transaction card, an NDEF READ TAG command and receiving, by the user communication device from the transaction card, card-specific challenge response information. The method also comprises authenticating the transaction card using the challenge response information.

Another aspect of the invention provides a user communication device comprising a communication device data processor and an NFC interface in communication with the data processor. The NFC interface is configured for communication with one or more transaction cards. The user communication device further comprises a communication device memory accessible by the data processor and containing a card communication application with instructions to be carried out by the data processor. The communication application is configured to establish a first NFC session with a transaction card, and transmit, to the transaction card, an NDEF WRITE TAG command including session-specific challenge information. The application is further configured to transmit, to the transaction card, an NDEF READ TAG command, receive, from the transaction card, card-specific challenge response information, and authenticate the transaction card.

Another aspect of the invention provides a transaction card comprising a card microprocessor, a near field communication (NFC) interface, and a card memory having a card identifier and one or more applets stored therein. The one or more applets include instructions for the card microprocessor to receive, from a user communication device via the NFC interface, an NDEF WRITE TAG command including challenge information and generate a digital signature using the challenge information. The one or more applets include further instructions to receive, from the user communication device via the NFC interface, an NDEF READ TAG command, and transmit, to the user communication device, the digital signature.

DETAILED DESCRIPTION OF THE INVENTION

The following description of embodiments provides non-limiting representative examples referencing numerals to particularly describe features and teachings of different aspects of the invention. While the invention will be described in connection with particular embodiments and environments, it will be understood that the invention is not limited to these embodiments and environments. On the contrary, it is contemplated that various alternatives, modifications and equivalents are included within the spirit and scope of the invention as described. Further, the embodiments described should be recognized as being capable of separate implementation or of combination with other embodiments.

As used herein, the term "transaction card" refers to any identification or payment card associated with a user or user account. This may include, in particular, a credit card, debit card, or gift card, any of which may be issued by a service provider. Smart transaction cards are often used to carry out transactions through near field communication (NFC) or brief contact communication (e.g., "tapping") with transaction processing devices. Because of inherent limitations in the transaction processing device, such cards may not be suitable for use in authentication, except as part of a low-level protocol.

The present invention provides an approach that enhances the value of a smart transaction card in carrying out a multi-factor security protocol. This approach involves a challenge response protocol that makes use of a user processing device's ability to transmit NFC data exchange format (NDEF) WRITE and READ commands to the transaction card. In methods of the invention, the user may establish an NFC communication session between the transaction card and the user device (e.g., by tapping or otherwise bringing the user device within communication range of the card). The user device transmits a WRITE NDEF to the transaction card. The transaction card reads the information from the WRITE command and uses it to create a digital signature. The user device then transmits a READ NDEF command to the transaction card, whereupon the transaction card transmits the digital signature to the user device. The signature may be accompanied by a certificate signed by a trusted authority. The user device may then itself validate the card signature or may pass the signature to a validation system. In either case, validation of the signature could be used for authentication of the presence of the transaction card and/or as an authentication factor in a multi-factor authentication of the user.

Figure 1:
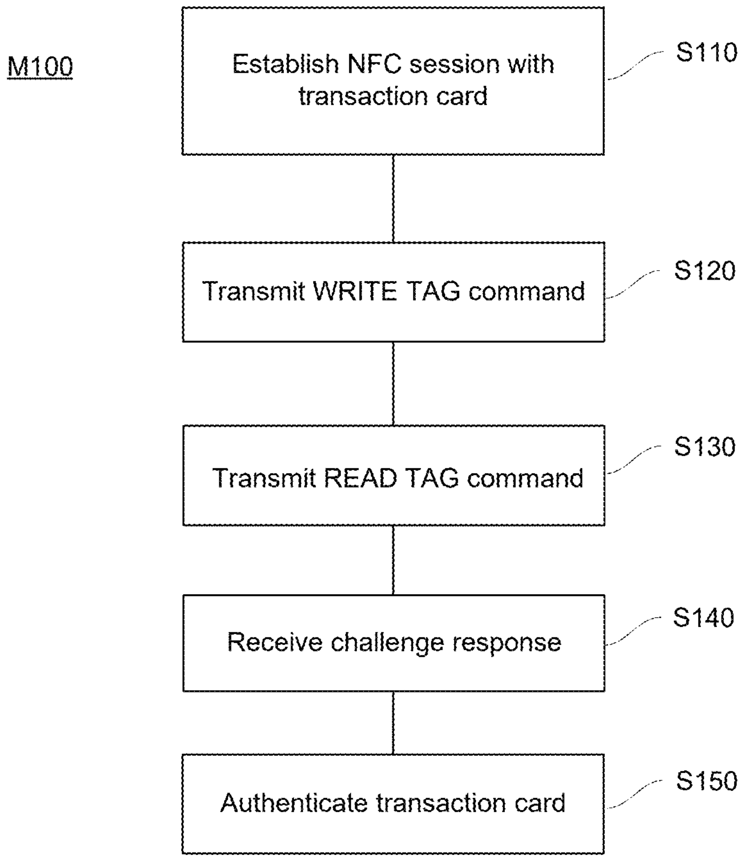
FIG. 1 is a flow chart of actions in a method of communicating with a transaction card according to an embodiment of the invention.

FIG. 1 illustrates a basic method M100 of communication between a user communication device and a transaction card. The method M100 can be used as part of a user and/or card authentication process. As will be discussed in more detail hereafter, transaction cards usable in methods of the invention may have a card data processor, a near field communication interface and a card memory. The card memory may have card-unique information stored therein, including a unique card identifier. In some embodiments, the card memory may have one or more encryption keys stored therein. The user communication device may be any data processing device having near field communication capability and will typically be a network-enabled computer system. As used herein, the term network-enabled computer system (and/or device) may include, but is not limited to, any computer device, or communications device including, a server, a microprocessor or system of microprocessors, a network appliance, a personal computer (PC), a workstation, and a mobile processing device such as a smart phone, smart pad, handheld PC, or personal digital assistant (PDA). In some examples, the computer device may use instructions stored on a computer-accessible medium (e.g., a storage device such as a hard disk, floppy disk, memory stick, CD-ROM, RAM, ROM, etc., or a collection thereof). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein. Mobile processing devices, in particular, may include NFC capabilities that allow for communication with other NFC-enabled devices by touching the devices together or bringing them into close proximity.

In some embodiments of the invention, the user communication device may be a merchant terminal or other device configured for carrying out financial and other transactions. Such merchant devise may be specifically configured for carrying out transactions based on an account associated with the transaction card and/or the transaction card administrator or processor. In other embodiments of the invention, the user communication device may be a mobile device, which may be associated with a user who is a holder of an account associated with the transaction card.

At S110 of the method M100, an NFC communication session is initiated between the user communication device and the transaction card. This will typically be accomplished by tapping the card to the user communication device or otherwise bringing the card to within NFC communication range of the user communication device. The action of initiating the NFC session may be taken as part of a purchase or other transaction that involves an account associated with the transaction card. In some embodiments, however, the action may be taken as part of an authentication or authorization protocol in conjunction with a transaction that does not otherwise involve an account associated with the transaction card. For example, a purchase may be made from a merchant using another card. The merchant may require authentication of the user/account holder using the smart transaction card, whereupon NFC communication can be established between a merchant terminal and the transaction card.

In some embodiments, the action of establishing NFC communication may be carried out in response to receiving an authentication request from a transaction processing server or authentication server. Such a request may, may be transmitted by the server in response to a request to carry out a transaction requiring verification of the presence of the transaction card or otherwise requiring authentication of the transaction card or the user. Upon receiving the authentication request, the user communication device may display or otherwise convey an instruction to initiate NFC communication with the transaction card.

In embodiments of the invention, the user communication device may include an application for transmitting standardized NDEF messages for communication with NFC-enabled devices. Such methods are used, in particular, for communication with standardized tags (e.g., Radio Frequency Identification (RFID) tags) and include "WRITE TAG" commands for assigning information to a tag and "READ TAG" commands for reading information from a tag. At S120 of the method M100, the user communication device transmits a WRITE TAG command to the transaction card. The WRITE TAG command includes challenge information for use by the transaction card in generating a challenge response. The challenge information may be or include information that is unique to the NFC session. This may include, for example, a one-time, random or pseudo-random or otherwise unpredictable number. The challenge information may be generated by the user communication device or by a requesting processing or authentication server. In some embodiments, the challenge information may be included in an authentication request received by the user communication device from a processing or authentication server. In other cases, the user communication device may transmit NFC session information to a requesting server and receive session-specific challenge information in return.

The user communication device transmits a READ TAG command to the transaction card at S130, and, at S140, receives a transmitted READ TAG response from the transaction card. In some embodiments of the invention, the READ TAG command must be sent to the transaction card within the same NFC communication session as the WRITE TAG command. In such embodiments, termination of the NFC session prior to the READ TAG command would result in termination without authentication of the transaction card. In these circumstances, card authentication would require a new NFC session and new challenge information. In other embodiments, however, the method M100 may include termination of the NFC session (e.g., by removal of the transaction card from NFC communication range) and initiation of a second NFC communication session prior to the action of transmitting the READ TAG command. In some embodiments, such termination and re-initiation of NFC communication may be an allowable occurrence while in others, it may be required.

Whether a single NFC session or multiple sessions are used, the method M100 may include a time limit for transmitting the READ TAG command. This time limit may be based on a predetermined maximum time interval between the transmitting of the WRITE TAG command and the transmitting of the READ TAG command. In embodiments where multiple NFC sessions are allowed or required, a maximum time interval between termination of the first session and initiation of the second session may be specified.

The READ TAG response includes challenge response information that is unique to the transaction card. This may include, for example, a card identifier. The challenge response information may be or include information that is generated by the transaction card's data processing chip using information that is permanently assigned and/or wired into a memory of the transaction card. In particular embodiments, the challenge response information may include information that is encrypted by the card data processing chip. The challenge response information may also include a digital authentication certificate from a trusted source. Such a certificate may be used as a public key in encrypting and decrypting the challenge response information.

At S150, the transaction card is authenticated using the challenge response information. In some embodiments, the authentication action may be carried out entirely by the user communication device. This may include comparing card-unique information to previously stored card information. Alternatively or in addition, authentication may include decrypting information encrypted by the transaction card data processor. Successful decryption would indicate a positive authentication of the transaction card. The foregoing approach may require, however, that one or more private encryption keys stored in the transaction card memory would also need to be available to the user communication device. To avoid this requirement, in some embodiments, the user communication device may transmit some or all of the challenge response information to an authentication-requesting server or directly to an authentication server having access to card-specific encryption keys. In such embodiments, the user communication device may receive back an authentication response indicating that the transaction card has been authenticated or that authentication failed.

In embodiments where authentication is carried out by the user communication device, the method M100 may further include transmitting the results of the authentication to a requesting processing server or authentication server.

Figure 2:
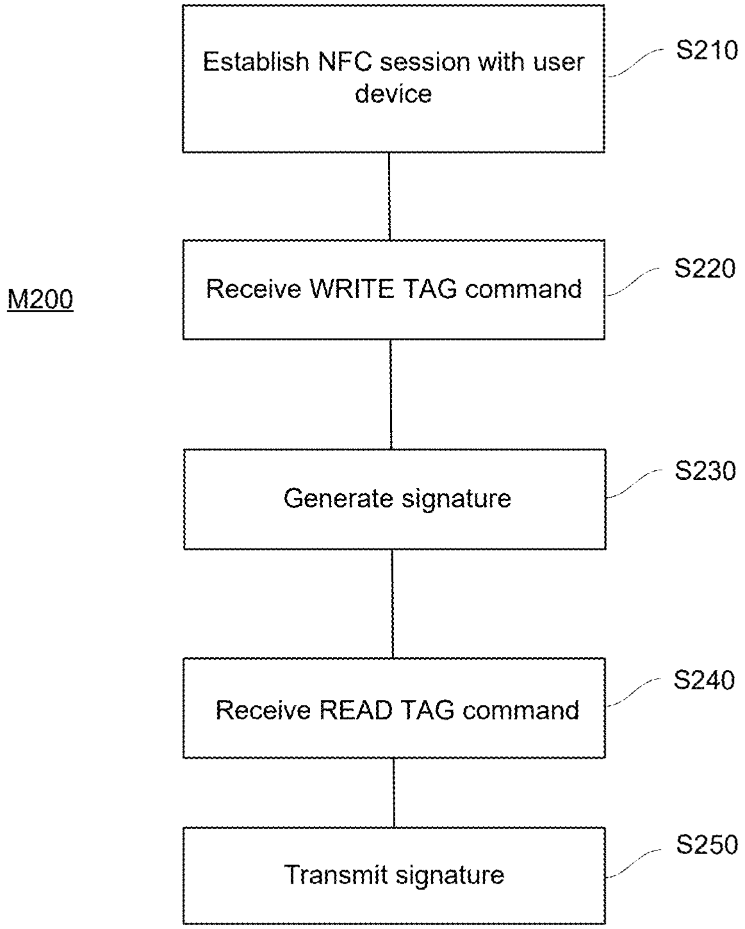
FIG. 2 is a flow chart of actions in a method of authenticating a communication between a transaction card and a user communication device according to an embodiment of the invention.

FIG. 2 illustrates a basic method M200 for a smart transaction card to authenticate communication with a user communication device according to an illustrative embodiment of the invention. A typical transaction card usable to carry out the method M200 has a card data processor, an NFC interface, and a card memory having a unique card identifier stored therein. In some embodiments, the card memory may also have one or more card-unique encryption keys stored therein. At S210, of the method M200, an NFC communication session is established between the card data processor and a user communication device. The user communication device may be, for example, a merchant transaction terminal, a mobile user device, or other network-enabled device or system. The NFC communication session may be initiated by tapping the card to the user communication device or otherwise bringing the card to within NFC communication range of the user communication device. At S220, the card data processor receives a WRITE TAG command from the user communication device via the card's NFC interface. The WRITE TAG command includes challenge information, which may be or include information that is unique to the NFC session. This may include, for example, a one-time, random or pseudo-random or otherwise unpredictable number.

At S230, the card data processor uses the challenge information to generate a challenge response. The challenge response information may be or include a card-unique and/or session-unique signature. In particular embodiments, the signature may be or include information from the challenge information that has been encrypted by the card processor using one or more card-unique encryption keys. A public key (e.g., a trusted source certificate) may also be used in the encryption. The challenge response may also include a card identifier and/or a public key used in the encryption of challenge information.

The card data processor receives a READ TAG command from the user communication device via the card NFC interface at S240 and transmits the challenge response back to the user communication device at S250.

Figure 3:
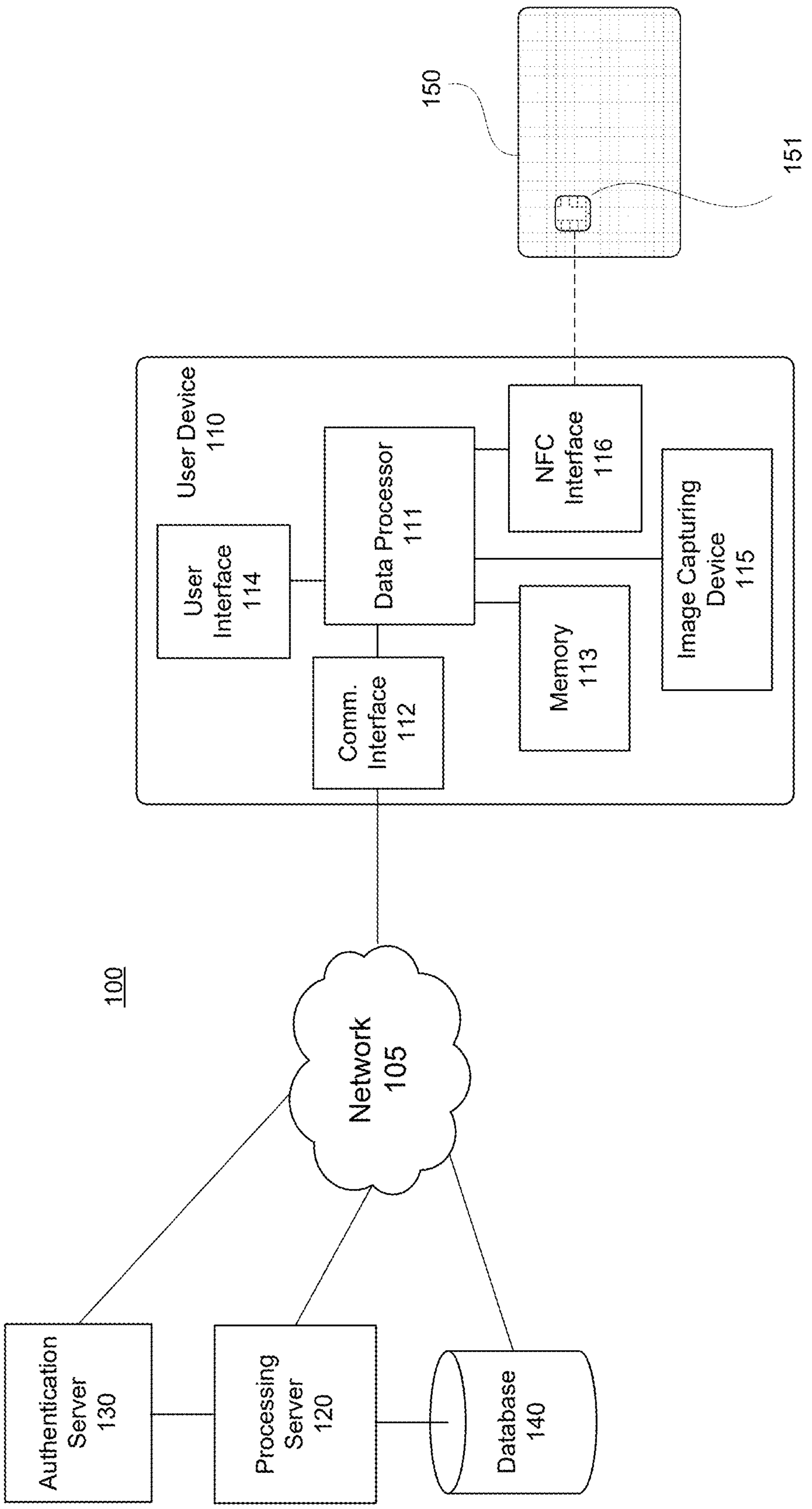
FIG. 3 is a schematic representation of a transaction card authentication system according to an embodiment of the invention.

With reference now to FIG. 3, an exemplary transaction card authentication system 100 according to an embodiment of the invention may include a user device 110, a transaction card 150, a processing server 120 and a card information database 140. The user device 110 may communicate with the processing server 120 via a network 105. The processing server 120 and/or user device 110 may also communicate with an authentication server 130. Although FIG. 3 illustrates certain components connected in certain ways, system 100 may include additional or multiple components connected in various ways. In particular, the system 100 may include multiple user devices 110 and multiple transaction cards 150.

The systems and components of the system 100 may be or include network-enabled computer devices and systems that are configured for processing account-related transactions. In particular, these systems may be configured to execute one or more software applications to, for example, receive data as input from an entity accessing the network-enabled computer system, process received data, transmit data over a network, and receive data over a network in order to process transactions originating from a merchant transaction device or an account holder's device. The various network-enabled computer systems may also include one or more software applications to transmit notifications to account holders (e.g., via the account holders' computer systems or mobile devices). It will be understood that the depiction in FIG. 3 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 3.

In the example embodiments presented herein, an account holder may be any individual or entity that desires to conduct a transaction (which may be, but is not limited to a financial transaction) with a merchant using a transaction account. An account may be held by any place, location, object, entity, or other mechanism for holding money or performing transactions in any form, including, without limitation, electronic form. An account may be associated with one or more transaction cards such as, for example, a credit or debit card or a prepaid card.

Figure 4:
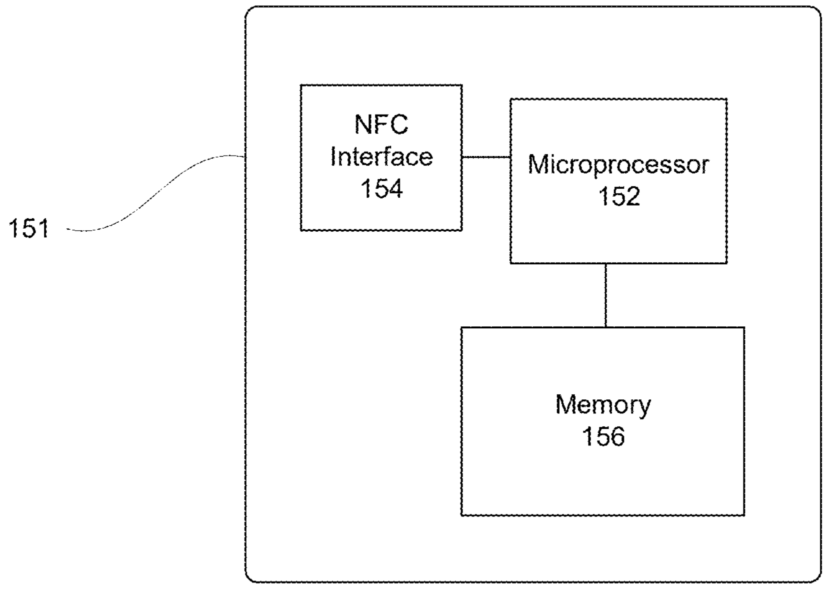
FIG. 4 is a block diagram of a transaction card microprocessor chip according to an embodiment of the invention.

The various components of the system 100 may, in particular, be configured for processing transactions involving the use of a transaction card such as the smart transaction card 150. The transaction card 150 may be any device having a processor configured for communicating via NFC and carrying out digital transactions and having a memory in which identification and encryption information can be stored. This may include chip-carrying transaction cards ("smart" cards), and mobile and non-mobile user computing devices. As illustrated in FIGS. 3 and 4, a typical transaction card 150 that is usable in various embodiments of the invention is a smart card with a microprocessor chip 151. The microprocessor chip 151 includes processing circuitry for storing and processing information, including a microprocessor 152 and a memory 156. It will be understood that the processing circuitry may contain additional components, including processors, memories, error and parity/CRC checkers, data encoders, anticollision algorithms, controllers, command decoders, security primitives and tamper-proofing hardware, as necessary to perform the functions described herein. The memory 156 may be a read-only memory, write-once read-multiple memory or read/write memory, e.g., RAM, ROM, and EEPROM, and the chip 151 may include one or more of these memories. The memory 156 may be configured to store one or more software applications for execution by the microprocessor 152. Information associated with an account may also be stored in the memory 156. In particular, the memory 156 may have permanently stored therein a unique alphanumeric identifier and one or more public and private card encryption keys.

The microprocessor chip 151 further includes an NFC interface 154 configured for establishing communication with the user device 110 or other devices when the card 150 is within a predetermined NFC range. In some embodiments, the NFC interface 154 may comprise a radio frequency identification chip configured to communicate via NFC or other short-range protocols. In some embodiments, the microprocessor chip 151 may include circuitry configured for communication with the user device 110 via other means such as Bluetooth, satellite, Wi-Fi, wired communications, and/or any combination of wireless and wired connections.

In particular embodiments, the memory 156 of the chip 151 microprocessor chip 151 may have stored therein one or more applets with instructions for generating encrypted information and transmitting it to a receiving device (e.g., the user device 110) via the NFC interface 154. Such encrypted information may be or include an encrypted verification block or signature that may be used by the user device 110 or the processing server 120 to authenticate and verify the presence of the transaction card 150.

The memory 156 may, in particular, have an authentication application stored therein having instructions for the data processor 152 to establish an NFC communication session with a user communication device 110 and receive, via the NFC interface 154, a WRITE TAG command transmitted by the user communication device 110. The application may be configured to recognize the WRITE TAG command as an authentication challenge and, upon such recognition, to generate a challenge response based on challenge information included therein. The challenge response may include challenge response information that is unique to the transaction card. This may include, for example, a card identifier. The challenge response information may be or include information that is generated by the data processor 152 using information that is permanently or temporarily stored in the card memory 156. In particular embodiments, the authentication application is configured to cause the processor 152 to generate a digital signature that may be unique to the transaction card 150 and/or the NFC session. The digital signature and/or other challenge response information may be or include a cryptogam encrypted using challenge information received in the WRITE TAG command by the card data processing chip. The cryptogram may be created by the processor 152 using one or more of the public and private encryption keys stored in the memory 156. The challenge response information may also include a digital authentication certificate retrieved from the memory 156.

The authentication application may also be configured to receive a READ TAG command via NFC from the user communication device 110. In response, the application may transmit the challenge response via the NFC interface 154. In some embodiments, the authentication application may be configured so that the action of generating a digital signature and/or other challenge response information is not carried out unless or until a READ TAG command is received. In such embodiments, the actions of generating the challenge response information and transmitting the challenge response information may both be done in response to receiving the READ TAG command. In some embodiments, either or both of these actions may be conditioned on a time interval between the WRITE TAG command and the READ TAG command being less than a specified maximum time interval. If the maximum time interval is exceeded, the microprocessor 152 may transmit a "timed out" error message to the user communication device 110 via the NFC interface 154.

In some embodiments, the authentication application may be configured to terminate the authentication procedure if the NFC session with the user communication device 110 is ended prior to receiving the READ TAG command. In other embodiments, the application may allow or require termination of the initial NFC session after the WRITE TAG command is received and subsequent establishment of a second NFC session in which the READ TAG command is received. As before, transmission of the challenge response may be conditioned on the READ TAG command being received within a maximum time interval after the WRITE TAG command.

The user communication device 110 may be any computer device or communications device including a server, a network appliance, a personal computer (PC), a workstation, and a mobile interface device such as a smart phone, smart pad, handheld PC, or personal digital assistant (PDA). The user communication device 110 may also be a transaction terminal (e.g., a merchant or bank terminal) used for carrying out financial transactions and other interactions with an account holder. The user device 110 includes an on-board data processor 111 in communication with a memory module 113, a user interface 114, a network communication interface 112, and an NFC interface 116. The user device 110 may optionally include an image capturing device 115 (e.g., a digital camera). The data processor 111 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 114 of the device 110 includes a user input mechanism, which can be any device for entering information and instructions into the user device 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays.

The network communication interface 112 is configured to establish and support wired or wireless data communication capability for connecting the device 110 to the network 105 or other communication network. The communication interface 112 can also be configured to support communication with a short-range wireless communication interface for communication via a short-range system such as Bluetooth.

The user device NFC interface 116 is configured for establishing near field communication with other NFC-enabled devices including, in particular, the data processing chip 151 of the transaction card 150. The NFC interface 116 is further configured for transmitting information to and receiving information transmitted by the data processing chip 151 via the chip NFC interface 154.

In embodiments of the invention, the memory 113 may have stored therein one or more applications usable by the data processor 111 to conduct and/or monitor transactions between the user device 110 and one or more processing servers 120 and authentication servers 130 over the network 105 and/or one or more merchant transaction terminals (not shown) via NFC, short-range communication, or the network 105. These applications may include instructions usable by the data processor 111 to identify transaction events, store event data in the memory 113, and communicate event data to the servers 120, 130. Some applications may also include instructions relating to receiving and interpreting instructions from the one or more processing servers 120 or the one or more authentication servers 130.

In particular embodiments, the memory 113 may include one or more applets configured for writing NDEF formatted information to NFC enabled tag devices (e.g., RFID tags) and/or for reading formatted information from such devices. These applets may include, in particular, instructions for executing a WRITE TAG command that causes formatted information to be transmitted to and stored in a memory of a receiving tag and instructions for executing a READ TAG command that causes formatted information to be transmitted by the tag and received by the user device 110. The memory 113 may also have stored therein a card communication application that can invoke the NDEF applets for use in a communication session with the transaction card 150. The card communication application may include instructions for the data processor 111 to establish a first NFC session with the transaction card 150 via the NFC interface 116 and then to transmit an NDEF WRITE TAG command to the transaction card 150 via the NFC interface 116. The application may also include instructions to assemble or receive session-specific challenge information that may be formatted for transmission via the NDEF WRITE TAG command. Such challenge information could include, for example, a session identifier or time stamp to differentiate the NFC session from other sessions. The challenge information may instead or in addition include information specific to an intended transaction card 150, the presence of which is required for completion of an authentication or authorization process. The challenge information may be generated by the data processor 111 using information received by the data processor 111 from a processing server 120 or authentication server 130 via the network communication interface 112 and/or information stored in the memory 113.

In some embodiments, the application may be configured to receive an authentication request from a transaction processing server 120 or authentication server 130. Such a request may, may be transmitted by the server in response to a request to carry out a transaction requiring verification of the presence of a particular transaction card 150 or otherwise requiring authentication of the transaction card 150 or the user. Such a request may include challenge information to be included in the WRITE TAG command. The application may be further configured to display information and instructions to the user of the user communication device 110 via the user interface 114. User instructions could include, for example, an instruction to initiate NFC communication with the transaction card 150.

The card communication application may further include instructions for the data processor 111 to transmit an NDEF READ TAG command to the transaction card 150 and to receive formatted response information from the transaction card 150 in return. The response information may include a card identifier and/or challenge response information constructed by the transaction card 150 using the challenge information. The application may also include instructions for the data processor 111 to use the challenge response information to authenticate the transaction card 150. This may be accomplished by direct comparison of the challenge response information to expected response information stored in the memory 113 or received from a requesting processing server 120 or authentication server 130.

In some embodiments, the action to authenticate the transaction card 150 may include transmitting the challenge response information to the authentication server 130 and receiving an authentication response back from the authentication server 130. In some embodiments, the challenge response information may be transmitted directly to the authentication server 130 via the network 105. In other embodiments, the user communication device 110 may transmit the challenge response information to the processing server 120 via the network 105 and the processing server 120, in turn, transmits the challenge response information to the authentication server 130.

In some embodiments, the challenge response information authentication may include information encrypted by the transaction card using card or account-associated encryption keys. In such embodiments, the card communication application may be configured to retrieve the required encryption key(s) from the memory 113 and to use them to decrypt the encrypted information. The application may condition authentication of the card 150 on successful decryption of the challenge response information.

The communication application may be configured to, upon establishing an authentication result, transmit the authentication result to the processing server 120, the authentication server 130, or other requesting system via the network 105.

The processing server 120 is a system of one or more network-enabled processing servers configured for processing transactions for an account associated with the transaction card 150. The processing server 120 is configured for selective communication with one or more user communication devices 110 (e.g., account holder mobile or other devices and merchant transaction terminals) via the network 105. The processing server 120 may be configured to store and retrieve account and transaction information in an account information database (not shown) and transaction card information in the card information database 140. The processing server 120 may receive transaction processing requests from any of the user devices 110 and is configured to use information from such requests to make determinations as to whether the requested transaction should be processed.

In some embodiments, the processing server 120 may require verification of the presence of an authorized transaction card 150 in order to process a transaction. In some such embodiments, the processing server may transmit a verification request to a user communication device 110 that is associated with the card 150 or its associated account. In other embodiments, the processing server 120 may transmit the request to a user communication device 110 (e.g., a merchant terminal) that is associated with the transaction to be processed. In either case, the verification request includes instructions for the user communication device 110 to establish an NFC communication session between the user communication device 110 and the transaction card 150 for verifying that the card 150 is in the possession of the account holder and/or in the presence of the transaction requester. In some embodiments, the verification is conducted by the user communication device 110 and the processing system 120 merely receives a response from the device 110 indicating a verification result. In some embodiments, however, the user communication device 110 may not conduct the verification and, instead, transmits to the processing server 120 challenge response information received from the transaction card 150. The processing server 120 may be configured to use the challenge response information to complete the authentication/verification of the transaction card 150. In some embodiments, however, the processing server 120 may forward the challenge response information to the authentication server 130 for completion of the authentication/verification process.

In some embodiments, the processing server 120 may generate challenge information that may be included in the verification request for submission by the user communication device 110 to the card 150. The challenge information may include card and/or transaction specific information. It may instead or in addition include an unpredictable challenge value such as a random or pseudo-random number.

The authentication server 130 may be a system of one or more network-enabled processing servers configured for selective communication with the user communication device 110 and/or the processing server 120 via the network 105. The authentication processor 130 may also be able to access the card information database 140 via the network 105 either directly or through the processing server 120. The authentication server 130 may be configured for transmitting card authentication requests to and receiving authentication responses from the user communication device 110. The authentication server 130 may be configured to generate challenge information for inclusion in an authentication request. Such challenge information may be or include card-specific information obtained from the card database 140. The challenge information may also or instead include one-time request or transaction-specific information to be used by the transaction card 150 to generate challenge response information. The authentication server 130 may be further configured to receive an authentication request response from the user communication device 110, the response including challenge response information generated by the transaction card 150. The authentication server 130 may be configured to use the challenge response information to verify that such information was generated by the expected transaction card 150.

The card database 140 may have stored therein one or more data records associated with the transaction card 150. In some embodiments, these records may include one or more private encryption keys assigned to the transaction card 150 and stored in the card memory 156. The one or more encryption keys may be accessed by the processing server 120 or the authentication server 130 as needed for decryption of card-encrypted information included in the challenge response information. The processing server 120 and/or the authentication server 130 may be configured for using the decryption keys and one or more public keys associated with the transaction card to decrypt the card-encrypted information to verify that the challenge response information was provided by the expected transaction card 150. In some embodiments, a public encryption key may be part of or included with the challenge response information.

The present invention provides a significant improvement in transaction security by providing enhanced security to the process of assuring the presence of an authenticated transaction card. By using session-specific information in combination with card-specific information to authenticate the presence of a particular account-associated card, the invention makes it difficult or impossible for an intercepting entity to use the information in a replay attack. The methods may be further enhanced by having the card itself encrypt session-specific information using private encryption keys available only from the card and a limited access card database.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A transaction card, comprising:

a card microprocessor;

a near field communication (NFC) interface; and a card memory storing a card identifier, an encryption key, and a public key, wherein the transaction card:

receives, from a user communication device via the NFC interface, a WRITE TAG command including session-specific challenge information;

receives, from the user communication device via the NFC interface, a READ TAG command, wherein the READ TAG command is received within a maximum time interval from the transmission of the WRITE TAG command or after the maximum time interval from the WRITE TAG command;

responsive to receiving the READ TAG command within the maximum time interval from the transmission of the WRITE TAG command:

generates a digital signature comprising a cryptogram encrypted using at least a portion of the session-specific challenge information, the encryption key, and the public key, and transmits, to the user communication device via the NFC interface, the digital signature; and responsive to receiving the READ TAG command after the maximum time interval from the transmission of the WRITE TAG command, transmits, to the user communication device via the NFC interface, an error message.

2. The transaction card of claim 1, wherein the encryption key is unique to the transaction card.

3. The transaction card of claim 1, wherein the encryption key is associated with an account associated with the transaction card.

4. The transaction card of claim 1, wherein:

the card memory further stores a signed certificate, and the transaction card transmits the signed certificate to the user communication device via the NFC interface with the digital signature.

5. The transaction card of claim 1, wherein the session-specific challenge information comprises a random number generated for the session.

6. The transaction card of claim 1, wherein the session-specific challenge information comprises a pseudo-random number generated for the session.

7. The transaction card of claim 1, wherein the session-specific challenge information is generated by the user communication device.

8. A method of communicating with a transaction card comprising a card microprocessor, a near field communication (NFC) interface, and a card memory storing a card identifier, an encryption key, and a public key, the method comprising:

receiving, by the transaction card from a user communication device via the NFC interface, a WRITE TAG command including session-specific challenge information;

receiving, by the transaction card from the user communication device via the NFC interface, a READ TAG command, wherein the READ TAG command is received within a maximum time interval from the transmission of the WRITE TAG command or after the maximum time interval from the WRITE TAG command;

responsive to receiving the READ TAG command within the maximum time interval from the transmission of the WRITE TAG command:

generating, by the transaction card, a digital signature comprising a cryptogram encrypted using at least a portion of the session-specific challenge information, the encryption key, and the public key, and transmitting, by the transaction card to the user communication device via the NFC interface, the digital signature; and responsive to receiving the READ TAG command after the maximum time interval from the transmission of the WRITE TAG command, transmitting, by the transaction card to the user communication device via the NFC interface, an error message.

9. The method of claim 8, prior to receiving, by the transaction card, the READ TAG command:

terminating, by the user communication device, a first NFC session with the transaction card; and establishing, by the user communication device within a predetermined time interval after termination of the first NFC session, a second NFC session with the transaction card.

10. The method of claim 9, wherein the second NFC session is established within a predetermined time interval after the termination of the first NFC session.

11. The method of claim 8, further comprising authenticating, by the user communication device after receipt of the digital signature, the transaction card using the digital signature.

12. The method of claim 11, further comprising:

receiving, by the user communication device from the transaction card, card- encrypted information, wherein authenticating the transaction card further comprises:

attempting to decrypt the card-encrypted information using at least one card-unique key associated with the card identifier, and responsive to a successful decryption of the card-encrypted information, establishing a positive authentication result.

13. The method of claim 8, further comprising receiving, by the user communication device from an authentication server via a network communication interface, the session-specific challenge information.

14. The method of claim 13, further comprising:

transmitting, by the user communication device to the authentication server via the network communication interface, the digital signature, and receiving, by the user communication device from the authentication server via the network communication interface, an authentication result.

15. The method of claim 14, further comprising transmitting, by the user communication device, the authentication result to a processing server.

16. The method of claim 8, wherein the digital signature is unique to an NFC session between the transaction card and the user communication device.

17. The method of claim 8, further comprising authenticating, by the user communication device after receipt of the digital signature, the transaction card using the digital signature.

18. The method of claim 8, further comprising, prior to receipt by the transaction card of the WRITE TAG command from the user communication device:

transmitting, by a processing server to the user communication device, a verification request, wherein the verification request comprises an instruction for the user communication device to establish an NFC session between the user communication device and the transaction card.

19. The method of claim 18, further comprising:

generating, by the processing server, the session-specific challenge information, wherein the session-specific challenge information is included with the verification request.

20. A non-transitory computer-accessible medium containing executable instructions, wherein, when executed by a transaction card comprising a card microprocessor and a near field communication (NFC) interface, cause the transaction card to perform procedures comprising:

receiving, from a user communication device via the NFC interface, a WRITE TAG command including session-specific challenge information;

receiving, from the user communication device via the NFC interface, a READ TAG command, wherein the READ TAG command is received within a maximum time interval from the transmission of the WRITE TAG command or after the maximum time interval from the WRITE TAG command;

responsive to receiving the READ TAG command within the maximum time interval from the transmission of the WRITE TAG command:

generating a digital signature comprising a cryptogram encrypted using at least a portion of the session-specific challenge information, an encryption key, and a public key, and transmitting, to the user communication device via the NFC interface, the digital signature; and responsive to receiving the READ TAG command after the maximum time interval from the transmission of the WRITE TAG command, transmitting, to the user communication device via the NFC interface, an error message.

* * * * *